United States Patent [19]

Munt

[11] 3,749,896

[45] July 31, 1973

[54] LEADING ZERO SUPPRESSION DISPLAY SYSTEM

[75] Inventor: Irwin Munt, Elizabeth, N.J.

[73] Assignee: Weston Instruments, Inc., Newark, N.J.

[22] Filed: Sept. 24, 1971

[21] Appl. No.: 183,374

[52] U.S. Cl. ............................ 235/152, 340/324 R
[51] Int. Cl. .............................................. G06f 3/14
[58] Field of Search .................... 235/152, 156, 159, 235/160, 164; 340/172.5, 324 R

[56] References Cited
UNITED STATES PATENTS

| | | | |
|---|---|---|---|
| 3,492,656 | 1/1970 | Hildebrandt .................... | 340/324 R |
| 3,537,073 | 10/1970 | Sakoda et al. .................. | 340/324 R |
| 3,564,503 | 2/1971 | Kubo et al. ..................... | 340/324 R |
| 3,646,544 | 2/1972 | Yamaguchi ...................... | 340/324 R |
| 3,375,498 | 3/1968 | Scuitto et al .................... | 235/156 X |

Primary Examiner—Malcolm A. Morrison
Assistant Examiner—David H. Malzahn
Attorney—William R. Sherman, Jerry M. Presson and Walter C. Farley et al.

[57] ABSTRACT

An apparatus for editing information to be presented to a display to remove unwanted leading zeroes. The apparatus includes logic circuit means for accepting information about the digit and the preceding digit and then deciding whether or not to blank the digit. If the blank decision is made the logic circuit provides an inhibit signal. The information provided to the logic includes a signal indicating that the digit be examined is or is not a zero; a signal indicating whether or not the preceding digit was blanked or that this is the first digit; and a signal indicating whether the digit under examination is immediately preceded by a decimal point. The digits examined in an ordered sequence beginning with the highest ordered digit and proceeding toward the lower, each digit being examined in a well-defined time interval and either blanked or not blanked before the next digit is examined.

8 Claims, 5 Drawing Figures

INVENTOR
IRWIN MUNT

LEADING ZERO SUPPRESSION DISPLAY SYSTEM

This invention relates to apparatus for eliminating unnecessary zero indications from a digital display.

In digital display devices having, for example, four places in which a value can be displayed, it is possible for there to be a display of a number such as 005.2. Clearly, the initial zeroes are not needed and, in fact, are not desirable because they tend to confuse the observer.

The principal object of this invention is to provide a simple, effective and efficient device for editing the display drive signals so that unwanted leading zeroes are not displayed.

Briefly described, the invention includes means for generating a plurality of electrical signals each representing a digit which is to be presented for display, means for examining each digit signal, in an ordered sequence, and for producing a signal to indicate that the digit signal has a zero value, means for generating a second signal indicating that either the preceding digit was blanked or the digit under examination is the first in the ordered sequence, means for generating a third signal when the digit under examination is not immediately preceded by the decimal point, and logic circuit means responsive to the three signals thus generated for producing a signal to inhibit display of that digit when the signals indicate that the value of the digit is zero, the preceding digit was, in fact, blanked, and the digit is not immediately preceded by the decimal point.

In order that the manner in which the foregoing and other objects are attained in accordance with the invention can be understood in detail, a particularly advantageous embodiment thereof will be described with reference to the accompanying drawings, which form a part of this specification, and wherein.

Figure 1:
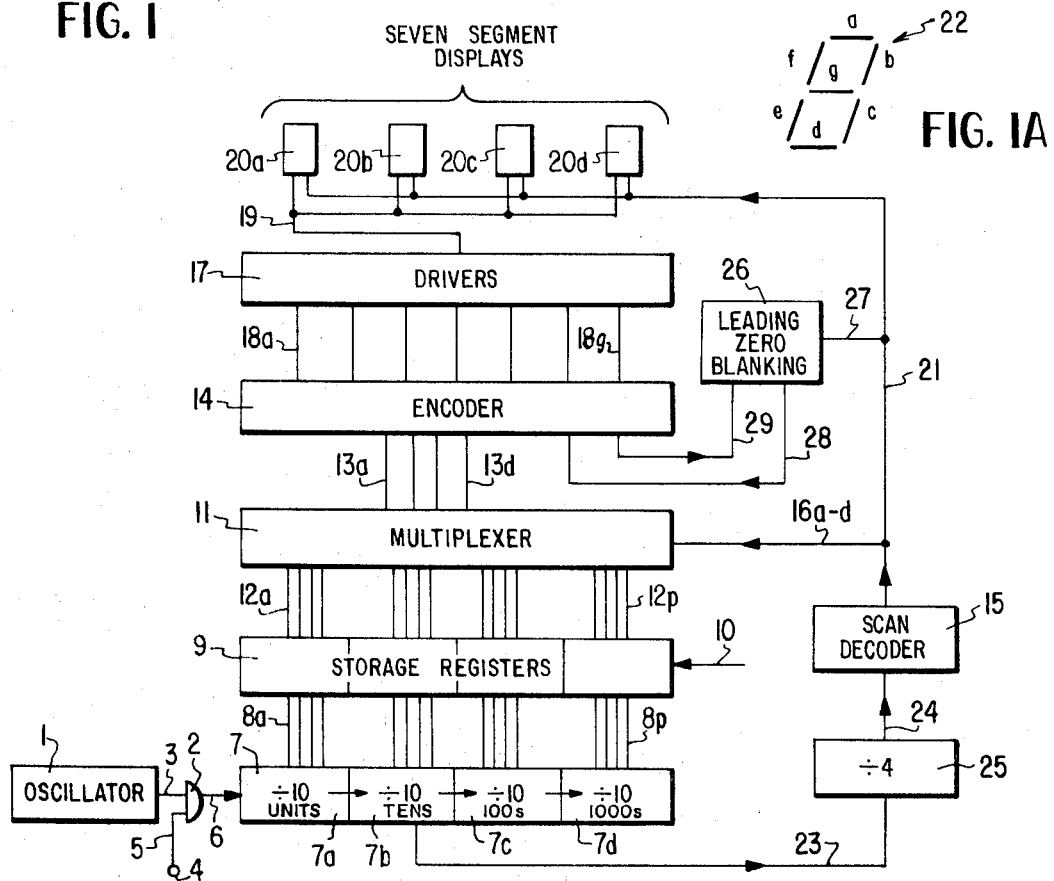
FIG. 1 is a schematic diagram, partly in block form, showing a counter and display apparatus with which the present invention can be used.

In the block diagram of FIG. 1 is shown an oscillator 1, which, in the specific example to be described, produces pulses at a frequency of 50 kHz. The oscillator output is connected to one input of an inhibit gate 2 through a path 3. A signal applied to a terminal 4 and through a path 5 to the second input of gate 2 releases the pulses from oscillator 1 to a counter chain 7 through a path 6. The gating signal, applied to terminal 4, may be obtained from an external source or may be supplied by control logic described in further detail hereinafter. The counter chain 7 has a total capacity of 9,999 counts, is resettable to 0, and increases its count in response to pulses supplied by the oscillator.

The counter chain 7 is comprised of 4 decade scalers, 7a through 7d which are identified as the units, tens, one hundreds, and one thousands scalers, respectively. each scaler consists of 4 bi-stable circuits interconnected with feedback so that the scaler counts from 0 – 9 pulses before overflowing and transmitting a pulse to the following scaler.

The output of the 4 scalers, which make up the counter chain 7, is transmitted through paths 8a through 8p to a storage register 9. The information contained in paths 8a through 8p is in binary form and is grouped in accordance with the 4 scalers just described, i.e., paths 8a through 8d contain the signals representing a count of 0 to 9 in binary form, from the unit scaler, etc. In order to simplify the drawing only paths 8a and 8p are labelled. It will be realized, however, that the second path from the left is 8b and the other paths are identified, in sequence, from left to right as 8c – 8p.

The storage register 9 consists of one temporary storage element for each path 8a through 8p, for a total of 16 storage elements. The storage elements may be flip-flops, latches, or other electronic circuits suitable for holding and releasing data bits on command.

On application of a transfer signal to a terminal 10, the binary information contained in the counter chain 7 is transferred to the storage register 9. The transfer signal applied to terminal 10 and the inhibit signal applied to terminal 4 are timed by logic circuits to prevent the transfer of an incomplete count from the counter chain 7 to storage register 9, i.e., the transfer command will not be applied until the series of pulses from oscillator 1 are turned off by inhibit gate 2.

A binary count held in storage register 9 is transferred to a multiplexer 11 through paths 12a through 12p. The signals contained in paths 12a through path 12p are in binary form and grouped to represent the units, tens, one hundreds and one throusands count, as previously described in relation to paths 8a – 8p.

The output of multiplexer 11 is conducted through paths 13a through 13d to an encoder 14.

Four sequential scan periods identified as periods L, M, N and O, are generated by the scan decoder 15 and applied to the multiplexer 11 through paths 16a–d. The function of the multiplexer is to sequentially connect the four output lines 13a–13d to each set of four lines at the input of the multiplexer. Thus during scan period L, the output lines 13a and 13d are connected to lines 12a through 12d at the input of the multiplexer, these lines representing the units count. During the scan period M, the output lines 13a through 13d are connected to lines 12e – 12h representing the tens data, etc. Thus the four-line output of the multiplexer will present, during the 4 scan periods L, M, N and O, the units, tens, one hundreds and one thousands count, respectively, in binary form.

In order for the digits to be examined in an ordered sequence beginning with the highest ordered digit and proceeding toward the lower, the thousands count is examined first in scan period O, followed by the hundreds in period N, tens in period M and finally the units in scan period L. The scan periods thus proceed in the ordered sequence O,N,M,L, as described in further detail hereinafter.

The encoder 14 converts four-line binary coded decimal data to 7-line bit parallel information at the output. The output of the encoder is connected to a group of seven drivers 17 through 18a–g. The drivers which provide voltage and current at the proper levels are connected to a group of 4, seven-segment displays 20a–d through a cable 19.

The four scan periods from the scan decoder 15 are connected to the seven segment displays by means of a multi-line conductor 21. Thus although the output of the 7 drivers is connected to all 4 displays in parallel, only one display is activated by the scan decoder at any one time, so that, for example, during scan period L display 20d is connected to the drivers, encoder, multiplexer and finally storage register containing the units count. During this same period the display 20d is illuminated by means of the scan signal through path 21. In the same way, during periods M, N and O display 20c, b and a are individually connected to the tens, hundreds and thousands storage register, and illuminated.

Figure 1A:
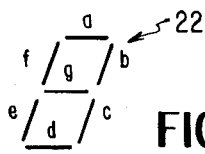
FIG. 1A is a diagram of a typical seven segment display.

Further details of the seven segment numeric display 20 are shown in FIG. 1A. In this type of display, application of a voltage to the proper connection of the display will cause the respective elements to be illuminated. For example, the application of a voltage to segments 22a, b and c will form the numeric character 7 while the application of a voltage to all of the segments will form the numeric character 8. The letters shown adjacent to the various segments of the displays are those normally used to identify those segments.

The scan decoder 15 operates at a frequency of 500 Hz which is obtained through paths 23 and 24 from the counter chain 7. The 500 Hz signal is divided into the four scan periods L, M, N and O by a counter circuit 25.

In operation the circuits of FIG. 1 are arranged to perform as described below.

Circuits of the Leading Blanking Zero logic, in accordance with the present invention are contained within block 26. An electrical signal from the encoder 14 is transferred to the blanking circuits 26 on path 29 when the displayed character is zero. Signals defining scan periods, which periods are the ordered sequence of time intervals, are supplied from the scan decoder 15 to the blanking logic through path 27. A blanking signal is applied through path 28 to the encoder 14 for the purpose of inhibiting the display of unwanted signals.

Oscillator 1 provides a series of pulses at a frequency of 50 kHz through enable gate 2 to counter chain 7. Gate 2 performs the function of turning the pulses on or off in response to the gating signal applied to terminal 4. The counter chain 7 is comprised of 4 "count of 10" scalers representing the units, tens, one hundreds and one thousands digits respectively. The scalers are connected through the storage register to the multiplexer. The outputs of the multiplexer are BCD (binary coded decimal) signals, representing only one of the four scalers at any given time. All four scalers, however, are connected in sequential order. The output of the multiplexer is connected to the encoder, where the signals are changed from 4-line binary coded decimal to 7-line parallel data. The 7-line data from the encoder is transferred to the four seven-segment displays through drivers 17. The seven segment displays and the multiplexer are enabled by the same scan signal from the scan decoder. Thus, the units display 20d is illuminated only wehn the multiplexer is sampling the lines 12a through 12d from the storage register.

The blinking rate of the displays is determined by the 500 Hz signal to the "divide by 4" counter 25, i.e., each display will individually blink at a rate of 125 Hz. The persistence characteristics of the displays, together with the human persistence of vision, is sufficient to make the displays appear as if they were continuously illuminated.

Figure 2:
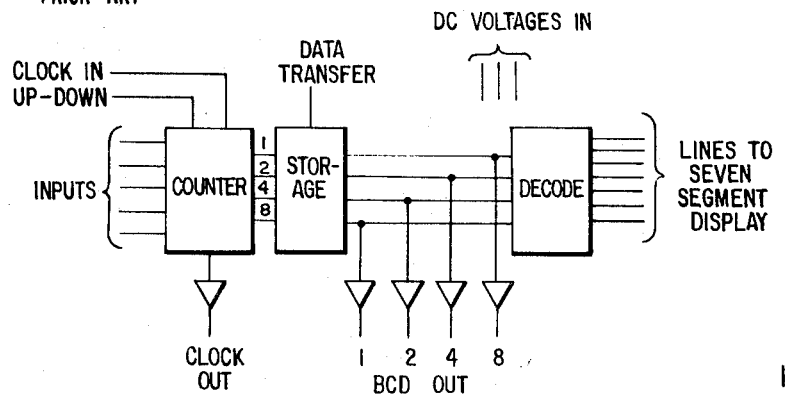
FIG. 2 is a schematic diagram of a typical, commercially available counting, storing and decoding package.

In FIG. 2 is shown a commercially available integrated circuit package which will perform the counting, storage and decoding functions described in reference to FIG. 1. The package shown is a Metal Oxide Semiconductor of the Large Scale Integration class. The IC circuit shown provides the counting storage and encoding functions for a "count of 10 decade" with BCD signals out and 7-line parallel signals to operate the 7-segment numeric displays. Four of these IC chips will perform the counting, storage, multiplexing, encoding, and display driving functions, as well as data transfer operations, just described in reference to FIG. 1. However, some modification and rearrangement of the interconnection paths is required.

Figure 3:
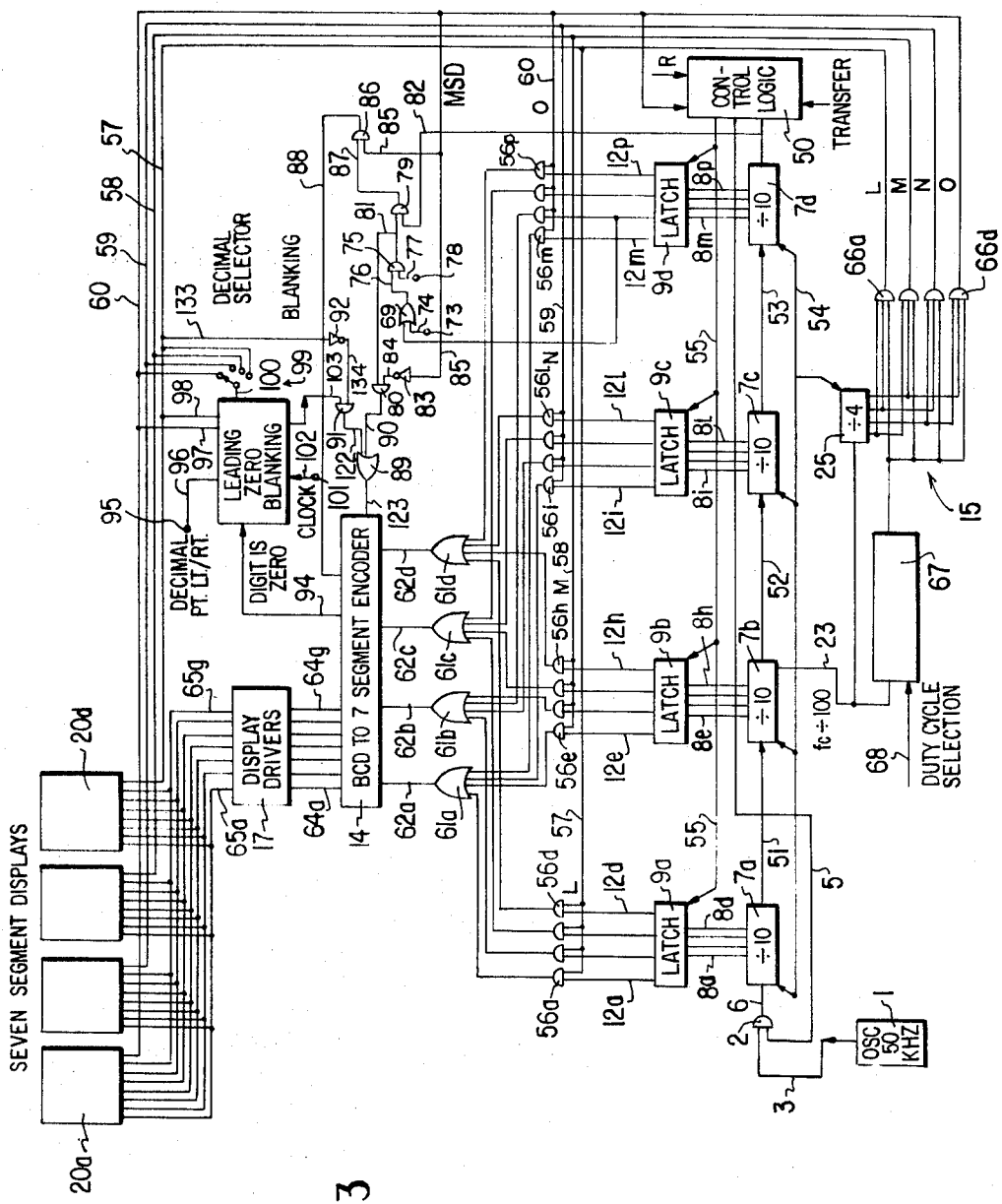
FIG. 3 is a more detailed schematic diagram showing a counting system incorporating the present invention.

In FIG. 3 are shown more details of the logic circuitry required to perform the functions shown and described. Like numbers have been used for like circuits and components.

Pulses at a frequency of 50 kHz are supplied from oscillator 1 through path 3 to one input of gate 2. Gate 2 is enabled by a signal generated by the control logic 50 and carried by path 5 to the second input of gate 2. The output of gate 2 is coupled to the units scaler 7a through path 6. The output of the scaler 7a is coupled to the "tens" scaler 7b through path 51. In a similar fashion the scaler 7b is coupled to 7c through path 52, the scaler 7c is coupled to scaler 7d through path 53. A reset signal from the control logic is supplied to all four scalers through path 54 for the purpose of initializing the scalers to zero count. The BCD output of the units, tens, one hundreds and one throusands scalers are connected through paths 8a through 8d, 8e through 8h, 8i through l, and 8m through 8p, respectively, to the latches 9a, 9b, 9c and 9d. The latch circuits are temporary storage elements which make up the storage register. A transfer signal generated by the control logic is applied through path 55 to the four latch elements. The transfer signal instructs the four latch elements to accept the count held in the four decade scalers.

The binary coded decimal information contained in the four latched elements 9a through 9d which make up the storage register is transferred to the multiplexer through paths 12a through 12p. A series of two input AND gates 56a through 56p make up the major elements of the multiplexer. Scan period L on a path 57 enables multiplexer gates 56a–d. Thus the units data stored in latch 9a is permitted, during the L scan period to travel to an OR gate 61a. In a similar fashion the scan signals on lines 58, 59, and 60 enable gates 56e–h, 56i–l, and 56m–p, thus permitting the data in tens, one hundreds and one thousands scalers to be transferred to OR gates 61b, c, and d, respectively.

The data held in the OR gates 61a through d is transferred to the encoder 14 through lines 62a through d. The encoder provides the circuits to convert from 4-line BCD to 7-line "seven segment code" suitable for operation of the display devices 121 as shown in FIG. 1A.

The output of the encoder is transferred to the display drivers 17 through paths 64a through g. The drivers supply the proper voltage and current levels to operate the seven segment displays.

The four scan periods L, M, N and O are transferred from the scan decoder shown generally as 15 to the four displays 20d–a by paths 57–60, respectively.

It should be noted that the displays 20 are wired to drivers 17 in parallel, but are activated (illuminated) in sequential order under control of the scan periods L, M, N and O.

The output of the tens scaler 7b is connected to the counter 25 through path 23. The frequency of the signal at path 23 is 500 Hz, i.e., 50 kHz divided by 100. Counter 25 is comprised of 2 bi-stable circuits which are inter-connected to function as a "count by 4 circuit." The four states of the two bi-stable circuits are connected to a decoding matrix which in turn is connected to a group of four, 3 input AND gates 66a–66d. Two inputs of each AND gate are connected to the decoding matrix and the third input of each gate is connected to the output of a duty cycle selector 67. From the output of the four AND gates 66a–d is obtained the four scan periods L, M, N and O, respectively. The duty cycle selector circuit 67 is connected to and synchronized by signals obtained from the tens scaler 7b through path 23. The choice of the duty cycle factor is made by external connection through path 68. The function of the duty cycle selector circuitry is to control the period during which the seven segments displays are illuminated, thus effectively controlling their brilliance.

The circuits that perform the functions of the overrange logic are shown in FIG. 3 immediately to the right of the 7 segment encoder 14. An OR gate 69 is connected to latch circuit 9d through THROUGH paths 70, 71, and 72. As an alternate arrangement the gate 69 may be connected through paths 74 to a terminal 73, thus the overrange logic will be under external control. The output of the gate 69 is connected to 1 input of AND gate 75 through path 76. A second input of the AND gate 75 is connected through a path 77 to a terminal 78. The output of AND gate 75 is connected to 2 "two input AND gates" 79 and 80 through path 81. The second input of AND gate 79 is connected through a path 82 to the overflow of the "one thousand" scaler. The second input of AND gate 80 is connected through an inverting amplifier 83 and a path 84 to scan period O through a path 85.

The output of AND gate 79 is connected to one input of a "two input" AND gate 86 through a path 87. The second input of AND GATE 86 is connected through path 85 to scan period O. The output of AND gate 86 is connected through a path 88 to the seven segment encoder 14. The output of AND gate 80 is connected to the four input OR gate 89 through a path 90. A description of OR gate 89, AND gate 91, and inverting amplifier 92 will be provided in conjunction with a description of the "leading zero blanking" circuit 93 to be described hereinafter.

The "leading zero blanking" circuit 93 has six input signals and one output blanking signal. The input signals are:

digit is zero decimal point left or right scan period O

SCAN PERIOD L decimal selector clock

The "digit is zero" signal is obtained from the seven segment encoder 14 and transferred through a path 94 to the blaning circuit 93. The signal identified as, "decimal point left or right" is obtained from an external source on terminal 95 and is applied to the leading zero blanking circuit 93 through a path 96. Scan periods O and L are applied to leading zero blanking circuit 93 through paths 97 and 98m respectively. A decimal selector signal obtained from the decimal selector switch shown generally as 99 is applied to the leading zero blanking circuit 93 through path 100. The scan periods L, M, N and O are applied to the decimal selector switch 99 through paths 57, 58, 59 and 60, respectively. The clock signal which is obtained from external circuitry through terminal 101 is applied through path 102 to leading zero blanking circuitry 93. The output blanking signal of the leading zero blanking circuit 93 is applied to the two-input AND gate 91 through path 103.

Figure 4:
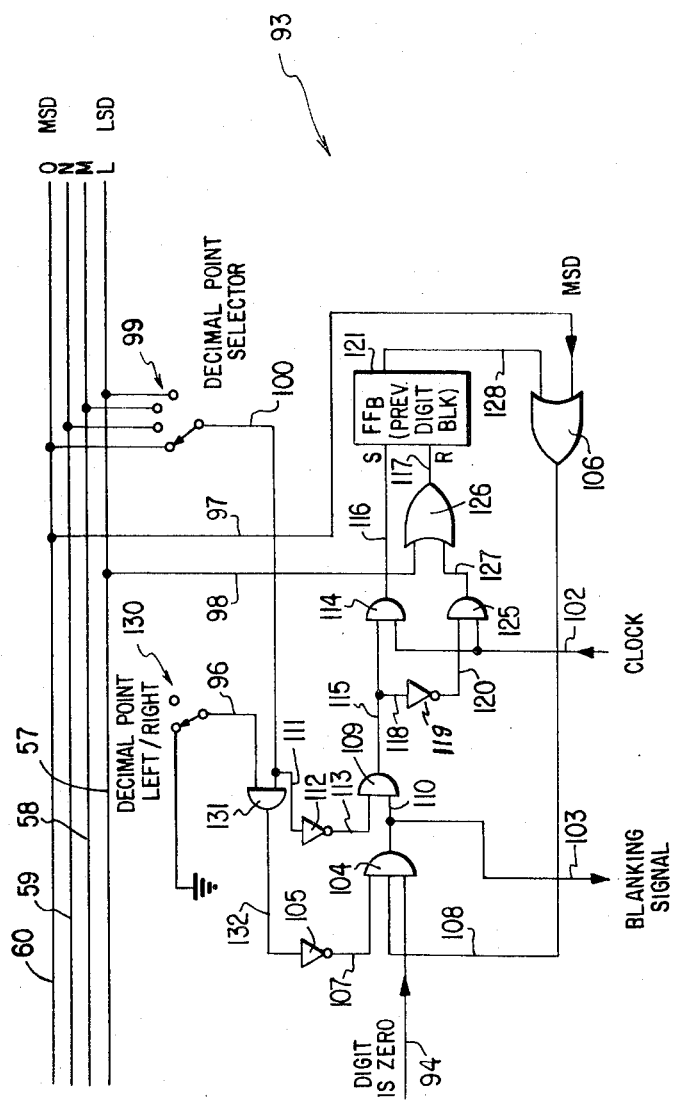
FIG. 4 is a more detailed schematic diagram showing the logic of the leading zero blanking circuit.

In FIG. 4 are shown details of the leading zero blanking circuit 93. A three-input AND gate 104 is connected to an inverting amplifier 105 OR gate 106 and the "digit is zero" signal through paths 107, 108 and 94, respectively. The output of AND gate 104 is connected to a two-input AND gate 109 through a path 110. The second input of AND gate 109 is connected to the decimal point selector shown generally as 99 through path 100, path 111 inverting amplifier 112 and path 113.

A two-input AND gate 114 functions to clock the "set" signal for a flipflop 121, i.e., bi-stable circuit, (identified as $FF_B$). The gate 114 receives a signal from gate 109 on a path 115. Clocking is accomplished by the clock signal obtained from an external source, which is applied to the second leg of the AND gate 114 through path 102. The output of gate 114 is used to set $FF_B$ through a path 116. In a similar fashion a reset signal is applied to $FF_B$ through a path 117 by a process described as follows. The output of gate 109 is coupled through a path 118 and inverting amplifier 119 through a path 120 to two input AND gate 125. The second input of AND gate 125 is clocked by a signal supplied through path 102. The output of AND gate 125 is coupled to an OR gate 126 through a path 127. The scan period L signal is applied on line 98 to the second input of OR gate 126.

The set output from flipflop 121 is conducted through path 128 to one of the two inputs of OR gate 106. The second leg of OR gate 106 is connected to line 60, scan period O, through line 97. The output of OR gate 106 is transmitted through path 108 to AND gate 104. The signal from a decimal point left right selector switch shown generally as 130 is transmitted through path 96 to AND gate 131 and through path 132 to inverter 105 and finally through path 107 to gate 104.

In operation the circuits of FIG. 4 perform as described below. Note first that the primary blanking signal on path 103 is generated by the coincidence of three signals at the input of AND gate 104. Note further that blanking of the seven segment displays is accomplished by the application of the blanking signal through path 123 to the seven segment encoder 14, these elements being shown in FIG. 3. Note further in reference to FIG. 3 that the blanking on path 103 is applied through AND gate 91, path 122 and OR gate 89 and finally through path 123 to the encoder.

Returning now to FIG. 4. In order for the leading zero blanking logic to "blank" the non-important zero and "not blank" important zeros it is necessary for the logic to receive information about the digit being displayed and other information regarding related digits. The logic must also receive logic timing signals. The logic information required by the blanking logic is:
is the digit zero?
was the previous more significant digit blanked?
is the decimal point immediately to the left of the digit in question?
is the scan period under examination the most significant digit?
is the scan period under examination the least significant digit?

If the above information is provided to the leading zero blanking logic, the logic makes the proper determination and blanks unnecessary leading zeros. The basic decision as to whether or not to blank a zero is made by the coincidence AND gate 104. That is, if there is coincidence between the signals on lines 107, 108 and 94, then a signal is transmitted through line 103 to cause a blanking of the zero. Since all digits are sequentially examined by the encoder 14, the presence of a zero during any one of the scan periods can be detected by a series of logic gates, i.e., comparators within the encoder structure. When a zero is detected a signal is transmitted to gate 104 via path 94. The signal indicating whether or not the previous more significant digit was zero is obtained from flipflop 121 via path 128, OR gate 106, and path 108. Flipflop 121 is used to store, during one scan period, the output of the coincident gage 104, thus the signal from flipflop 121 can be used to determine was the previous digit zero.

The third signal required to form coincidence in gate 104 is obtained from the decimal point selector shown generally as 99 through path 100, gate 131, path 132, inverting amplifier 105, and finally path 107. Scan periods L,M,N and O are contained on lines 57, 58, 59 and 60, respectively. NOtice that scan period L is the least significant digit identified as LSD while scan period 0 is most significant digit or MSD. Decimal point selector 99 selects one of these four scan periods to indicate the location of the decimal point. The scan period which is selected by the decimal point selector is fed through gate 131 to the inverting amplifier 105. The inverting amplifier 105 effectively permits coincidence to be formed by AND gate 104 during the three periods not selected by the decimal point selector. Note that the decimal point left/right selector switch 130 is employed to enable or disable gate 131. The decimal point left/-right selector swtich 130 is a factory type adjustment used to permit the leading zero blanking logic to be employed with either logic systems where the decimal point is defined as being to the left of the digit or with systems where the decimal point is defined as to the right of the digit.

As stated previously, coincidence of three signals at the input of gate 104 is used to provide a blanking signal for the seven segments displays. Note, however, that an additional start signal is required during the first of each four scan periods. That is, since coincidence can be obtained only through the presence of a signal on path 108 and since this signal is obtained by the set condition of flipflop 121, through path 128, and OR gate 106, and further that setting flipflop 121 can only occur in the presence of a coincidence signal from gate 104, through path 110, gate 109, path 115, gate 114, and finally path 116, it must be necessary to insert some additional start signal. This start signals is the most significant digit signal which is scan period 0 obtained on line 60 through path 97 to OR gate 106 which, during this one scan period, overrides the absence of a set signal from flipflop 121 and permits coincidence at gate 104 during the most significant scan period.

Flipflop 121 is reset by one of two signals. It can either be reset by scan period L which is the least significant digit period, through line 98 to OR gate 126 and path 117 to the reset terminal of the flip-flop or reset may be accomplished by the absence of a coincident signal from gate 104 through AND gate 109, path 115, path 118 to inverting amplifier 119, path 120, AND gate 125, and path 127, to OR gate 126. Gates 114, 125 are used to clock both the set and reset signals to the flipflop 121 so that the state of the flipflop may be changed immediately before the scan period is advanced to the next scan period.

If the decimal point is to the right of the digit to be blanked, gate 109 prevents setting flipflop 121 so that any zero immediately to the right of the decimal point will be displayed, thus in the example − .09 the zero will be displayed.

Referring again to FIG. 3, note that the blanking signals is applied through path 103, gate 91, path 122 through OR gate 89, and path 123 to the encoder. The other signals applied to the three remaining inputs of OR gate 89 are for the purpose of displaying an over-range signal. That is, if the count exceeds 2,000, signals which are applied through gates 69, 75 and 80 are for the purpose of blanking the three significant digits. At the same time gates 79 and 86 are used in conjunction with the signal from the output of the final counter, which is applied through path 82, to cause the most significant digit to become a one and to blink, thus indicating to the operator that an overrange count has been applied to the system. A signal applied to terminal 73 through path 74 to gate 69 will disable the entire over-range logic system. A signal from scan period 0 on line 57 which is termed the least significant digit is fed through path 133, and inverting amplifier 92, through path 134, to AND gate 91, and OR gate 89, to the encoder. It is used to exclude the least significant digit from the zero blanking command.

What is claimed is:

1. An apparatus for editing a multi-digit character display in ordered sequence to prevent the display of unwanted zeroes comprising the combination of: means for generating a plurality of electrical signals each representative of a digit; first means for examining each said electrical signal and for generating a first output signal when the digit represented by that signal has a zero value; means for generating a second output signal when either the preceding digit was blanked or the digit is the first in the ordered sequence; means for generating a third output signal when the digit under examination is not immediately preceded by the decimal point; and second means for examining said first, second, and third output signals related to each digit in the ordered sequence and for making a display/not display decision for each digit before examining signals related to the next digit in the ordered sequence, said second means for examining comprising logic circuit means for examining said first, second and third output signals for each digit and for producing a signal to inhibit the display of that digit only when said first, second and third output signals exist concurrently.

2. An apparatus according to claim 1 wherein said second means for examining said first, second and third output signals further includes means for establishing an ordered sequence of time intervals, each of said time intervals being used to examine one of said digits and to sequentially activate the displays in the absence of a signal to inhibit.

3. An apparatus according to claim 2 wherein said logic circuit means includes a first logic AND gate for producing a blanking signal when said first, second and third output signals are combined; and wherein said means for generating said second output signal includes a bi-stable circuit for storing an input signal during a single time interval and for producing an output signal in the next subsequent time interval only when the digit examined during said single time interval was blanked, said means for generating said second output signal further including a logic OR gate which generates said second output signal when an input signal is obtained from the output of said bi-stable circuit and generates said second output signal when an input signal is received from said means for establishing an ordered sequence of time intervals, which input signal is obtained when the digit being examined is the most significant digit.

4. An apparatus according to claim 1 wherein said ordered sequence commences with the highest ordered character and proceeds toward the lowest.

5. An apparatus according to claim 1 wherein said means for generating said second output signal includes a bi-stable circuit settable to a first state when a digit is blanked and a second state when it is not blanked.

6. An apparatus according to claim 1 wherein said circuit means for generating said third output signal is adjustable to cooperate with a logic format wherein the decimal point is to the left of the digit under examination and wherein the decimal point is to the right of the digit under examination.

7. A method for editing a multi-digit character display in ordered sequence to prevent the display of unwanted zeroes comprising the steps of: generating a plurality of electrical signals each representative of a digit; examining each said electrical signal and generating a first output signal when the digit represented by that signal has a zero value; generating a second output signal when either the preceding digit was blanked or the digit is the first in the ordered sequence; generating a third output signal when the digit under examination is not immediately adjacent a decimal point; and examining said first, second and third output signals related to each digit in the ordered sequence and making a display / not display decision for each digit before examining signals related to the next digit in the ordered sequence, said examination of the output signals comprising the logic steps of examining said first, second and third output signals for each digit and for producing a signal to inhibit the display of that digit only when said first, second and third output signals exist concurrently.

8. A method according to claim 7 wherein said examining said first, second and third output signals further includes the establishment of an ordered sequence of time intervals, each of said time intervals being used to examine one of said digits and to sequentially activate the display in the absence of a signal to inhibit.

* * * * *